United States Patent
Kang et al.

(10) Patent No.: US 12,171,238 B2
(45) Date of Patent: Dec. 24, 2024

(54) METHOD FOR CONTROLLING COOKING APPLIANCE

(71) Applicant: LG ELECTRONICS INC., Seoul (KR)

(72) Inventors: Chung Kang, Seoul (KR); Changuk Lee, Seoul (KR); Siyoung Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 691 days.

(21) Appl. No.: 17/366,930

(22) Filed: Jul. 2, 2021

(65) Prior Publication Data

US 2022/0000124 A1    Jan. 6, 2022

(30) Foreign Application Priority Data

Jul. 3, 2020 (KR) .................. 10-2020-0082088

(51) Int. Cl.
*A21B 1/26* (2006.01)
*A21B 1/36* (2006.01)
*A21B 1/40* (2006.01)
*F24C 7/08* (2006.01)

(52) U.S. Cl.
CPC .................. *A21B 1/40* (2013.01); *A21B 1/26* (2013.01); *A21B 1/36* (2013.01); *F24C 7/087* (2013.01)

(58) Field of Classification Search
CPC .... A21B 1/40; A21B 1/26; A21B 1/36; A21B 3/04; F24C 7/08; F24C 7/087; F24C 15/327; A47J 12/17; A47J 37/0641; A47J 2027/043
See application file for complete search history.

(56) References Cited

U.S. PATENT DOCUMENTS

| | | | |
|---|---|---|---|
| 6,029,649 A | 2/2000 | Su | |
| 6,271,502 B1 | 8/2001 | Lee | |
| 7,060,941 B1* | 6/2006 | Embury | F24C 15/327 99/468 |
| 7,235,762 B2* | 6/2007 | Gagas | F24C 15/18 219/400 |
| 11,780,766 B2* | 10/2023 | Gwoo | C03C 4/20 126/273 R |
| 11,832,752 B2* | 12/2023 | Lee | F24C 7/083 |
| 2007/0215142 A1* | 9/2007 | Uchiyama | F24C 1/14 126/369 |
| 2014/0348987 A1 | 11/2014 | Cheng et al. | |
| 2017/0343221 A1* | 11/2017 | Swayne | F24C 15/327 |

FOREIGN PATENT DOCUMENTS

| | | | | |
|---|---|---|---|---|
| DE | 2621926 A1 * | 5/1977 | ............... | F24C 7/08 |
| EP | 2287533 A1 | 2/2011 | | |
| EP | 2933566 A1 | 10/2015 | | |
| JP | 4444312 B2 | 3/2010 | | |

(Continued)

*Primary Examiner* — Avinash A Savani
(74) *Attorney, Agent, or Firm* — Bryan Cave Leighton Paisner LLP

(57) ABSTRACT

A cooking appliance may control operations of a steam supply device configured to supply steam into a cooking space and a heating unit configured to heat an inside of the cooking space, thereby maintaining a temperature in the cooking space at a boiling point of water or less during cooking.

18 Claims, 8 Drawing Sheets

(56) References Cited

FOREIGN PATENT DOCUMENTS

| | | | |
|---|---|---|---|
| JP | 2014122773 A | 7/2014 | |
| JP | 6289602 B2 | 3/2018 | |
| KR | 100538172 B1 | 12/2005 | |
| KR | 20060030560 A * | 4/2006 | ............... F24C 7/04 |
| KR | 1020160133190 A | 11/2016 | |
| WO | WO-2009026760 A1 * | 3/2009 | ............. A47J 27/04 |
| WO | 2014019018 A1 | 2/2014 | |
| WO | 2017/145792 A1 | 8/2017 | |
| WO | 2018148363 A1 | 8/2018 | |

\* cited by examiner

Temperature (°C)

METHOD FOR CONTROLLING COOKING APPLIANCE

CROSS-REFERENCE TO RELATED APPLICATION

This application claims priority to and the benefit of Korean Patent Application No. 10-2020-0082088, filed on 2020 Jul. 3, the disclosure of which is incorporated herein by reference in its entirety.

TECHNICAL FIELD

Disclosed herein is a method for controlling a cooking appliance, and specifically, a method for controlling an operation of a cooking appliance such as an oven providing a steam function.

BACKGROUND

Cooking appliances are installed in the kitchen and cook food as a user intends. The cooking appliances can fall into different categories, based on a heat source or a type, and the sort of fuel.

Additionally, the cooking appliances can be categorized into an open type cooking appliance in which food is placed in an open space, and a sealed type cooking appliance in which food is placed in a closed space, based on a way of cooking food. The sealed type cooking appliance includes an oven, a microwave oven and the like, and the open type cooking appliance includes a cooktop, a hob, and the like.

In the sealed type cooking appliance, a space, in which food is placed, is shielded, and the shielded space is heated to cook food. The sealed type cooking appliance is provided with a cooking space in which food is placed and which is shielded and closed when the food is cooked. In the cooking space, food is actually cooked.

The sealed type cooking appliance is provided with a door that selectively opens and closes the cooking space in a swivelable manner. The door is installed at a main body in a swivelable manner by a door hinge provided between a cavity, having the cooking space therein, and the door. The door swivels with respect to a portion where the door and the cavity are coupled through the door hinge to selectively open and close the cooking space.

A heat source is disposed in an inner space of the cooking space opened and closed by the door, to heat the cooking space. The heat source may include a gas burner and/or an electric heater and the like.

The sealed type cooking appliance using an electric heater as a heat source can be provided with a plurality of electric heaters to cook an object to be cooked in the cooking space. For example, a broil heater can be disposed in an upper portion of the cooking space, and/or a bake heater can be disposed in a lower portion of the cooking space.

Additionally, a convection device can be disposed at a rear of the cooking space. The convection device circulates air in the cooking space to deliver heat evenly to the entire cooking space.

During operation of the cooking appliance, at least one of the broil heater and the bake heater is driven depending on the kind of an object or food to be cooked. The convection device can be selectively driven during operation of the broil heater and/or the bake heater.

The cooking appliance can operate in different cooking modes depending on the sort of an object or food to be cooked. For example, the cooking appliance can operate in a roast mode to roast meat or fish, or can operate in a bake mode to bake bread or cookies and the like. Driving of each heater and/or driving time of each heater depends on a cooking mode.

In recent years, in addition to widely-known cooking methods such as oven-based cooking, baking, steaming and the like, novel cooking methods have been developed or unique cooking methods have been shared by more and more people. Vacuum cooking (sous vide cooking) is one of the cooking methods.

Sous vide is a cooking method by which nutrients, texture, taste and the like can be preserved in the best possible way based on low-temperature vacuum cooking. Sous vide cooking using air was devised by Benjamin Thomson, Count Rumford in 1799. In 1960s, engineers in the U.S. and France exploited sous vide as a way of preserving food. In 1974, George Pralus used the sous vide cooking method to cook foie gras. Then Bruno Coussalult promoted the sous vide cooking method. "Sous vide" denotes low-temperature vacuum cooking and is French for "Under vacuum". Since 1970, high-end restaurants in Europe have used the vacuum cooking method as a way of cooking food. In recent years, vacuum cooking has been introduced into South Korea and used as a way of preparing haute cuisine in some fine dining restaurants or hotels.

In vacuum cooking (sous vide cooking), a food item contained in a sealed plastic bag is heated in water of a low temperature of about 50 to 60° C. for a long time (LTLT). The cooking method can help to keep taste of a food ingredient and to preserve texture, flavor and nutrients of the food ingredient in the best possible way. In particular, the cooking method may preserve texture of a food ingredient as best as possible. When meat is cooked at a high temperature, the meat is too chewy due to protein deformation. On the contrary, vacuum cooking can prevent meat from becoming chewy, keep meat tender and moist, and heat meat uniformly.

Vacuum cooking requires a long time to cook food (ordinarily 4 to 48 hours), and in vacuum cooking, it is difficult to adjust cooking time and temperature. Accordingly, to perform vacuum cooking effectively, an additional cooking appliance exclusive for vacuum cooking is needed.

Additionally, steam ovens configured to cook food using high-temperature steam are on the market. The steam ovens spray high-temperature steam into a cooking space, and adjust humidity based on an amount of steam. The steam ovens can prevent food from drying, cook a large amount of food and perform multiple-stage cooking operations. Additionally, the steam ovens can perform various functions such as prevention of evaporation of taste and flavor and preservation of taste and flavor of cooked food.

The steam ovens include a cavity forming a cooking space, a door configured to open and close an opening on a front surface of the cooking space, a heat source configured to heat the cooking space, and a steam supplier configured to supply steam into the cooking space.

If vacuum cooking with a steam oven is possible, usability of the steam oven may improve and no additional cooking appliance exclusive for vacuum cooking is required.

Accordingly, there is a growing need for methods for controlling steam and adjusting a temperature of steam in a steam oven to perform vacuum cooking effectively.

SUMMARY

Technical Problem

The present disclosure is directed to a method for controlling a cooking appliance, which may help to perform vacuum cooking (sous vide cooking) effectively using a steam oven.

The present disclosure is also directed to a method for controlling a cooking appliance, which may help to maintain a constant temperature in a cooking space effectively during steam-based cooking.

The present disclosure is also directed to a method for controlling a cooking appliance, which may help a single cooking appliance to perform all of a vacuum cooking operation and a re-cooking operation that is performed in a different way after the vacuum cooking operation.

Technical Solution

To achieve the above aims, a cooking appliance in one embodiment may control operations of a steam supply device configured to supply steam into a cooking space and a heating unit configured to heat an inside of the cooking space, thereby maintaining a temperature in the cooking space at a boiling point of water or less during cooking.

Accordingly, vacuum cooking (sous vide cooking) may be effectively performed only using a steam oven without using an additional cooking appliance exclusive for vacuum cooking.

In a preheating step, an amount of steam supplied into the cooking space may be adjusted to a maximum level, and in a cooking step, the amount of supplied steam may be adjusted to an amount less than the amount of supplied steam in the preheating step.

The heating unit may include a convection heater disposed on a rear surface of a cavity in a way that the convection heater is adjacent to a convection fan, and in the preheating step and the cooking step, the convection heater among the heaters may only operate.

Accordingly, a sufficient amount of steam for vacuum cooking may be supplied into the cooking space, and a temperature in the cooking space may be maintained at a temperature fit for vacuum cooking.

In the cooking step, the steam supply device may operate earlier than the convection heater may.

Accordingly, a constant temperature may be effectively maintained in the cooking space during steam-based cooking.

A method for controlling a cooking appliance according to one aspect, including a cavity provided therein with a cooking space, a steam supply device configured to supply steam into the cooking space, a heating unit configured to heat an inside of the cooking space and a convection fan configured to generate air current flowing in the cooking space, may include: a first preheating step of operation the steam supply device with a first output and operating the heating unit with a second output for one period; and a cooking step of operating the steam supply device with a third output less than the first output and operating the heating unit with a fourth output less than the second output every one period, after completion of the first preheating step, and the first preheating step and the cooking step may include maintaining a temperature in the cooking space at a boiling point of water or less.

A cooking appliance according to one aspect includes a cavity provided therein with a cooking space, a steam supply device configured to supply steam into the cooking space, a heating unit configured to heat an inside of the cooking space and a convection fan configured to generate air current flowing in the cooking space, a controller configured to perform: operating the steam supply device and the heating unit; and maintaining a temperature in the cooking space at a boiling point of water or less.

Preferably, the controller may perform: a first preheating step of operation the steam supply device with a first output and operating the heating unit with a second output for one period; and a cooking step of operating the steam supply device with a third output less than the first output and operating the heating unit with a fourth output less than the second output every one period, after completion of the first preheating step, and the first preheating step and the cooking step may include maintaining a temperature in the cooking space at a boiling point of water or less.

Preferably, the first preheating step may include operating the steam supply device to supply steam into the cooking space for first set time of one period, and operating the heating unit to heat an inside of the cooking space for second set time of one period.

Preferably, the cooking step may include operating the steam supply device to supply steam into the cooking space for third set time less than the first set time every one period, and operating the heating unit to heat the inside of the cooking space for fourth set time less than the second set time every one period.

Preferably, an average hourly amount of supplied steam in the first preheating step may be the same as an average hourly amount of supplied steam in the cooking step.

Preferably, one period described above may be 60 seconds, the first set time may be 13 to 17 seconds, and the third set time may be 7 to 9 seconds.

Preferably, one period described above may be 60 seconds, the second set time may be 18 to 22 seconds, and the fourth set time may be 7 to 9 seconds.

Preferably, in the cooking step, the steam supply device and the heating unit may operate at different timings.

Preferably, in the cooking step, the steam supply device may operate earlier than the heating unit may.

Preferably, the cooking step may include supplying steam into the cooking space and heating the inside of the cooking space to maintain the temperature in the cooking space in a temperature range of 30 to 90° C.

Preferably, the convection fan may operate through the first preheating step and the cooking step.

Preferably, the heating unit may include a convection heater disposed on a rear surface of the cavity in a way that the convection heater is adjacent to the convection fan, and in the first preheating step and the cooking step, the convection heater among the heaters may only operate.

Preferably, the method may further include a second preheating step of operating the steam supply device with the first output and operating the heating unit with the second output for one period between the first preheating step and the cooking step.

Thus, the preheating is mainly made by steam supply, whereas the maintaining of the temperature is provided by the convection heater to thereby provide the low temperature and long time heating required for vacuum cooking.

Furthermore, after having performed the vacuum cooking in the cooking space the food is taken out of the sealed package and put in the same cooking space again to be grilled or baked as desired.

Advantageous Effect

A cooking appliance according to the present disclosure may perform vacuum cooking (sous vide cooking) effectively only using a steam oven without using an additional cooking appliance exclusive for vacuum cooking, thereby enhancing usability of the steam oven and reducing costs and space for the cooking appliance exclusive for vacuum cooking.

The cooking appliance may properly adjust a timing of supply of steam, an amount of supplied steam, and a timing of operating a convection heater, thereby effectively maintaining a constant temperature in the cooking space during steam-based cooking and effectively improving the quality of a product of vacuum cooking.

The cooking appliance may perform all of an oven cooking operation, a vacuum cooking operation, and a re-cooking operation which is performed in a different way after the vacuum cooking operation, thereby improving economic efficiency, efficiency and usability of the cooking appliance.

DETAILED DESCRIPTION

Figure 1:
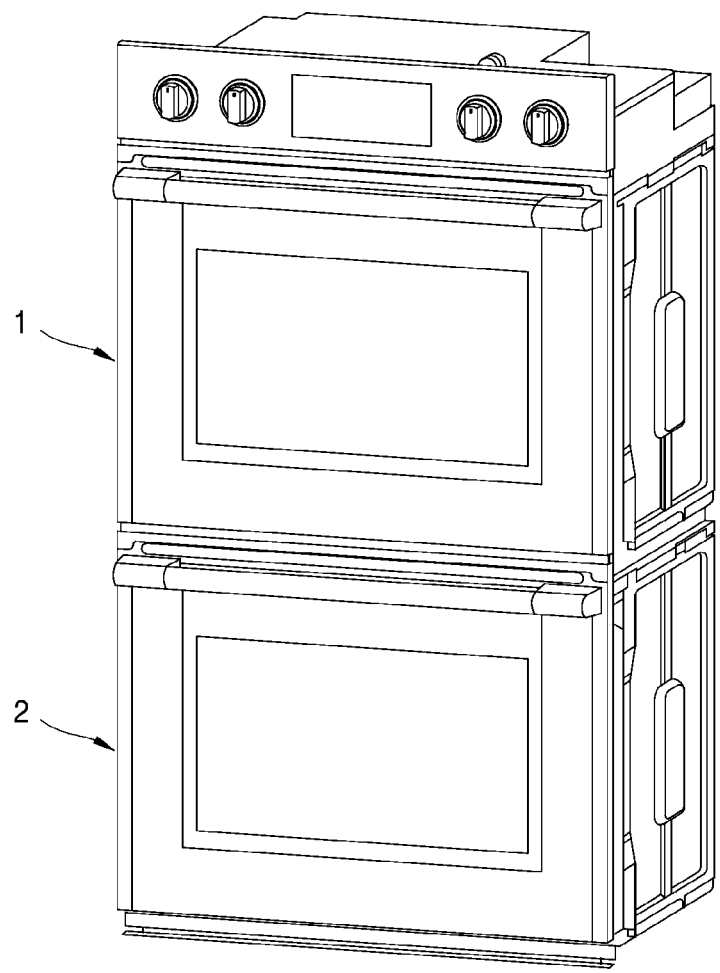
FIG. 1 is a front perspective view showing a cooking appliance.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the subject matter of the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When one component is described as being "in an upper portion (or a lower portion)" of another component, or "on (or under)" another component, one component can be placed on the upper surface (or under the lower surface) of another component, and an additional component may be interposed between another component and one component on (or under) another component.

When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "have" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

[Entire Structure of Cooking Appliance]

Figure 2:
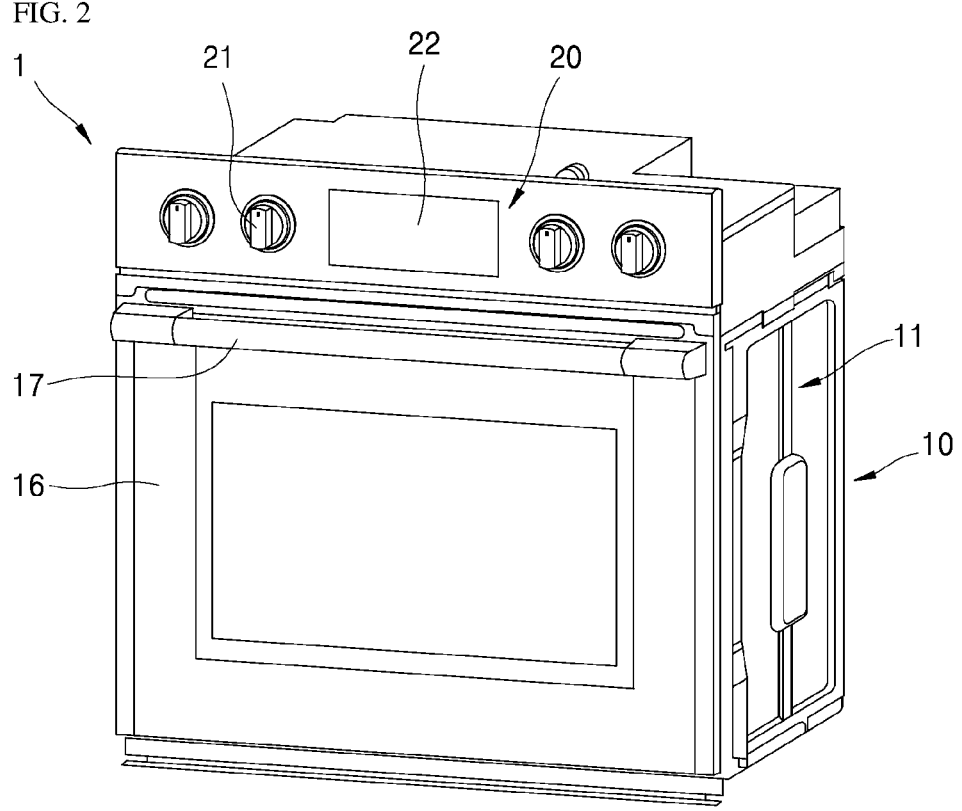
FIG. 2 is a front perspective view showing a portion separated from the cooking appliance in FIG. 1.
Figure 3:
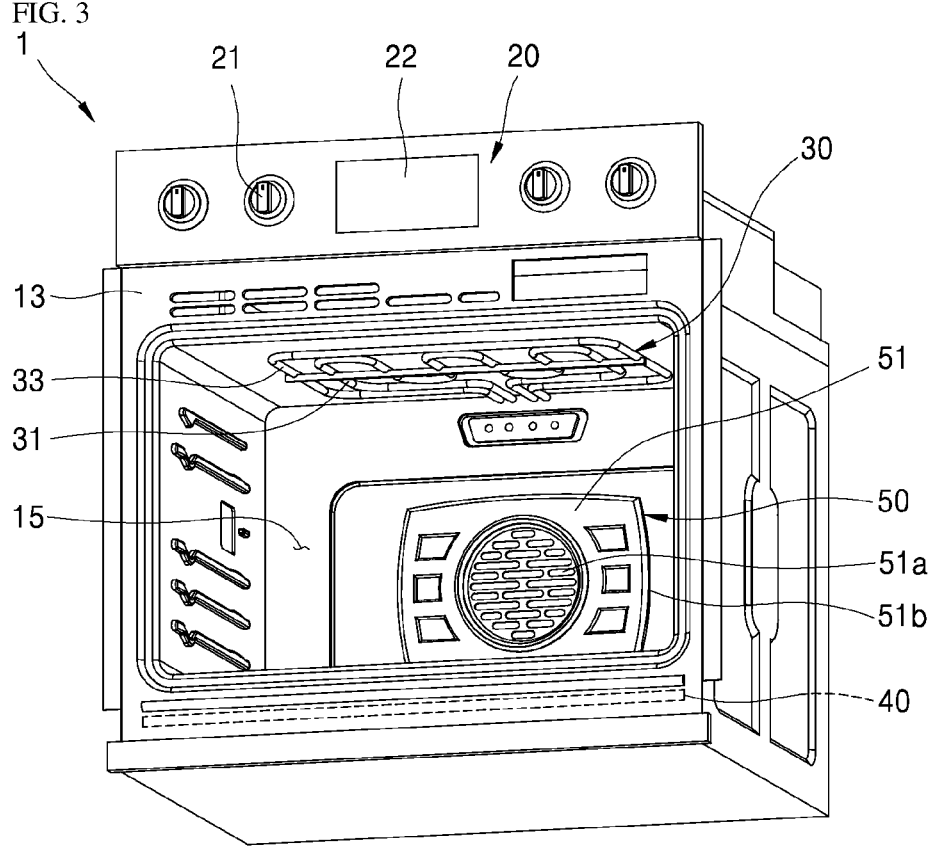
FIG. 3 is a front perspective view showing the cooking appliance in FIG. 2 without a door.

FIG. 1 is a front perspective view showing a cooking appliance in one embodiment, FIG. 2 is a front perspective view showing a portion separated from the cooking appliance in FIG. 1, and FIG. 3 is a front perspective view showing the cooking appliance in FIG. 2 without a door.

Referring to FIG. 1, the cooking appliance of one embodiment may include a first unit 1 in an upper portion of the cooking appliance, and a second unit 2 in a lower portion of the cooking appliance.

In this embodiment, the first unit 1 and the second unit 2 may all be a sealed type cooking appliance such as an electric oven and the like, but not limited.

In one example, the cooking appliance may include an electric oven as the first unit 1 in the upper portion thereof, and a gas oven as the second unit 2 in the lower portion thereof or vice versa. On the contrary, the cooking appliance may include a gas oven as the first unit 1 in the upper portion thereof, and an electric oven as the second unit 2 in the lower portion thereof.

In another example, instead of an oven, another kind of sealed type cooking appliance such as a microwave oven may be used as the first unit 1 or the second unit 2, or an open type cooking appliance such as a cooktop, a hob, a griddle and the like may be used as the first unit 1 and disposed onto the second unit 2.

Hereunder, a configuration of a cooking appliance including electric ovens as the first unit 1 and the second unit 2 is described as an example. In the description, a configuration of the first unit 1 is mainly described.

Referring to FIGS. 2 to 3, a main body 10 may form an exterior of the first unit 1. The main body 10 may have a shape including an approximate cuboid shape. The main body 10 may be made of a material having a predetermined strength to protect various components installed in an inner space thereof. Furthermore, the material should be strong enough to place another cooking appliance on top of it.

The main body 10 may include a cavity 11 forming a skeleton of the main body 10, and a front panel 13 disposed at a front of the cavity 11 and forming a front surface of the main body 10. The cavity 11 may have a cooking space 15 therein, and an opening may be formed at the front side of the cavity 11, which can be opened via the door 16 to open the cavity and to access the objects to be cooked inside the cavity 11. To check the temperature the cooking appliance may have one or more temperature sensors located inside or close to the cooking space. The sensing values are provided to the controller 60 to control the operation times of the steam supplier and/or heating unit and/or fan.

The main body 10 may have the cooking space 15 therein. The cooking space 15 may have a hexahedron shape a front surface of which is open. When the cooking space 15 is closed, an inner space of the cooking space 15 may be heated to cook food. That is, in the cooking appliance, the inner space of the cooking space 15 may be a space where food is actually cooked.

The cooking appliance may be provided with a heating unit configured to heat the cooking space 15. As an example of the heating unit, a broil heater 30 configured to heat the inner space of the cooking space 15 from above may be disposed at an upper side of the cooking space 15.

As another example of the heating unit, a bake heater 40 configured to heat the inner space of the cooking space 15 from below may be disposed at a lower side of the cooking space 15. Further, as an example of the heating unit, a convection device 50, configured to heat the inner space of the cooking space 15 as a result of convection of hot air, may be disposed at a rear side of the cooking space 15.

The cooking appliance might have one or two or all of the above mentioned heating units.

The main body 10 may be provided with a door 16 configured to swivel and open or close the cooking space 15, at a front thereof. The door 16 may be a pull-down type door that opens and closes the cooking space 15 in a way that an upper end of the door 16 swivels with respect to a lower end of the door 16 in an up-down direction.

The door 16 may have a hexahedron shape having a predetermined thickness as a whole, and may have a handle 17 on a front surface thereof. A user may grip the handle 17 to swivel the door 16. However, the door may be also mounted on a drawer, to be drawn out and inserted into the cavity to close the opening.

A control panel 20 may be provided in an upper portion of a front surface of the cooking appliance, i.e., on a front surface of an upper portion of the cavity 11. However, the control panel might be also located at the rear portion of the top surface. The control panel 20 might be formed by a vertical plate or by an inclined plate to facilitate the operation of the user. The control panel 20 may form a portion of an exterior of the front surface of the cooking appliance. The control panel 20 may be provided with one or more knobs 21 for controlling an operation of the cooking appliance, and/or a display 22 configured to display an operation state of the cooking appliance or any other information, and the like.

[Structures of Heating Unit and Steam Supply Device]

Figure 4:
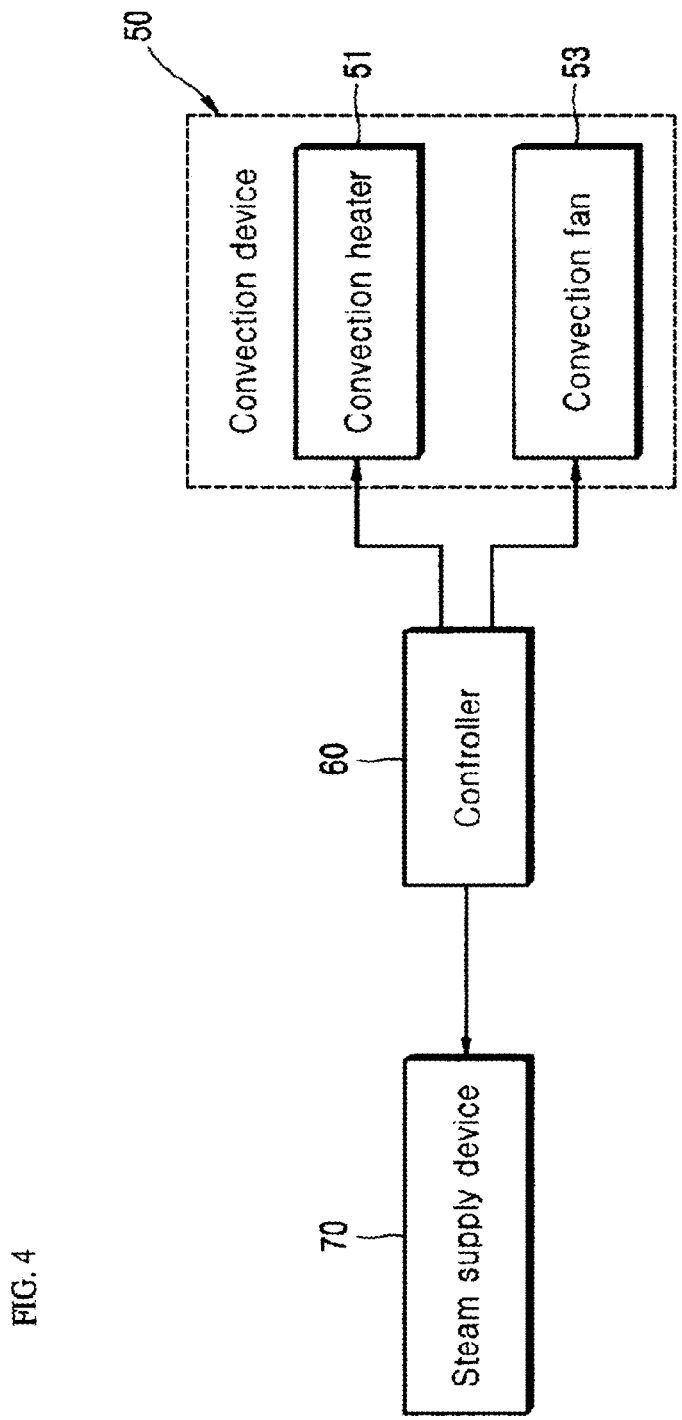
FIG. 4 is a schematic block diagram showing a configuration of a cooking appliance.

FIG. 4 is a schematic block diagram showing a configuration of a cooking appliance.

Referring to FIGS. 3 and 4, the cooking appliance in this embodiment may include a broil heater 30, a bake heater 40 and a convection device 50.

The broil heater 30 may be disposed in the cooking space 15. The broil heater 30 may be arranged on an upper surface of the cavity 11 and disposed in an upper portion of the cooking space 15.

In this embodiment, the broil heater 30 includes an inner broil heater 31, and an outer broil heater 33, for example. However, also other forms of the broil heater might be used. It might also only a single broil heater.

The inner broil heater 31 may be arranged on the upper surface of the cavity 11 and disposed inside the broil heater 30 including the inner broil heater and the outer broil heater in a transverse direction thereof. The outer broil heater 33 may be arranged on the same surface or level as the inner broil heater 31 and disposed outside the inner broil heater 31 in a transverse direction thereof. The outer broil heater 33 may be disposed closer to lateral surfaces of the cavity 11 than the inner broil heater 31. The outer broil heater 33 may surround or enclose the inner broil heater 31 in horizontal level.

The broil heater 30 may heat an inside of the cooking space 15 from the upper portion of the cooking space 15. That is, the broil heater 30 may be configured to directly heat an object to be cooked from the upper portion of the cooking space 15.

The inner broil heater 31 of the broil heater 30 may emit heat at a center of the upper portion of the cooking space 15. The inner broil heater 31 may mainly serve as a heat source heating air in the cooking space 15.

The outer broil heater 33 may emit heat at a position where the outer broil heater 33 is closer to the lateral surfaces of the cavity 11 than the inner broil heater 31. The outer broil heater 33 may serve as a heat source heating the lateral surfaces of the cavity 11 as well as a heat source heating air in the cooking space 15 directly. That is, the lateral surfaces of the cavity 11 may be heated mainly by the outer broil heater 33 rather than the inner broil heater 31.

The bake heater 40 may be disposed outside the cooking space 15. The bake heater 40 may be arranged on a bottom surface of the cavity 11 and disposed under the lower portion of the cooking space 15. That is, the bake heater 40 may be disposed in a lower portion of an outer side of the cooking space 15.

Since the bake heater 40 is disposed outside the cooking space 15, the bake heater 40 may serve as a heat source heating the bottom surface of the cavity 11 instead of heating air in the cooking space 15 directly. That is, the bottom surface of the cavity 11 may be mainly heated by the bake heater 40.

The convection device 50 may be arranged at a rear of the cooking space 15 and disposed on a rear surface of the cavity 11. The convection device 50 may include a convection cover 51 arranged on the rear surface of the cooking space, a convection heater 53 installed in an inner space of the convection cover 51, and a convection fan 55.

The convection cover 51 may be provided with an inlet 51a and an outlet 51b. The inlet 51a may be formed at a center of a front surface of the convection cover 51 facing the door 16 (see FIG. 2), and the outlet 51b may be formed on lateral surfaces of the convection cover 51, which face the lateral surfaces of the cooking space 15. The convection heater 53 may heat air flowing into or through the convection cover 51.

The convection fan 55 may operate in a way that the convection fan 55 generates air current while rotating in the convection cover 51. The convection fan 55 operating as described above may generate an air circulation flow in which air in the cooking space 15 is suctioned into a fan cover through the inlet 51a and air heated in the convection cover 51 is discharged to the cooking space 15 through the outlet 51b.

Driving of the broil heater 30, the bake heater 40 and the convection device 50 may be controlled by a controller 60. The controller 60 may adjust a supply of power to the broil heater 30, the bake heater 40 and the convection device 50 to control the driving of the broil heater 30, the bake heater 40 and the convection device 50.

Figure 5:
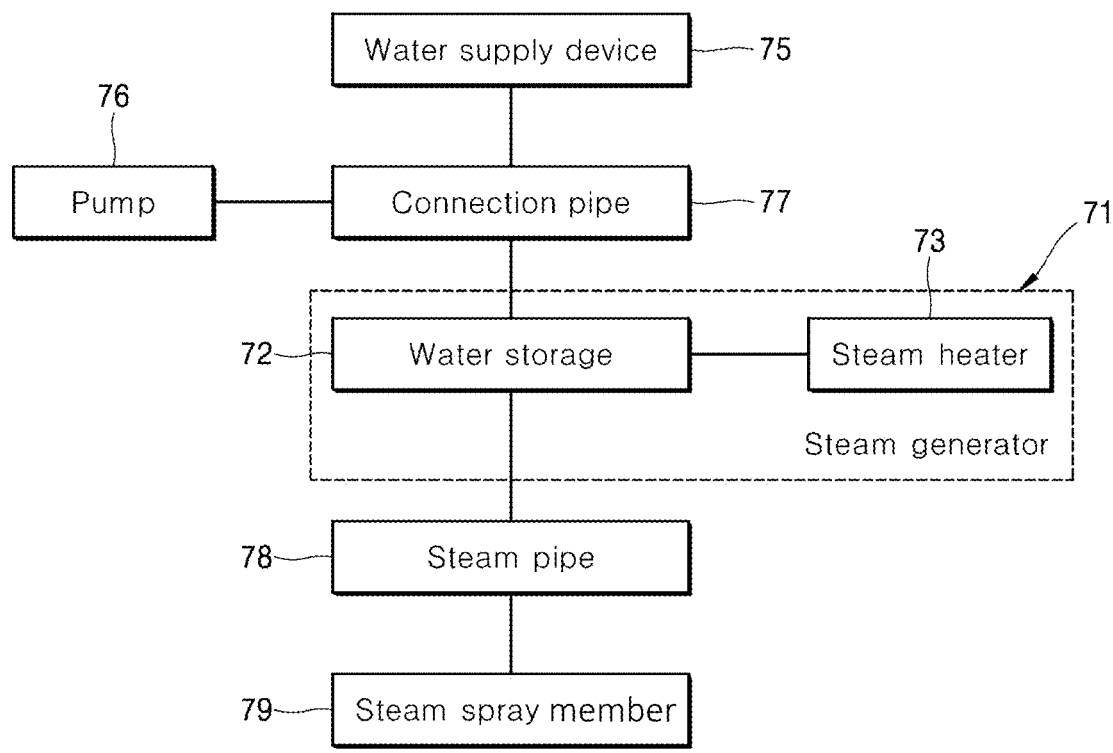
FIG. 5 is a block diagram showing a configuration of a steam supplier in one embodiment.

FIG. 5 is a block diagram showing a configuration of a steam supply device 70 of one embodiment.

Referring to FIGS. 3 to 5, the cooking appliance may be further provided with a steam supply device 70. The steam supply device 70 may be a component configured to supply steam to the inside of the cooking space 15. Preferably, the steam supply device 70 provides or supplies the steams from a rear surface portion of the main body 10 to the inside of the cooking space 15. The steam supply device 70 may include a steam supplier 71, a water supply device 75 and a connection pipe 77.

The steam supplier 71 may be a component that generates steam by heating water. The steam supplier 71 may include a water storage 72 configured to accommodate water supplied from the water supply device 75 through the connection pipe 77, and a steam heater 73 configured to heat the water stored in the water storage 72 and generate steam. The steam supplier 71 may be also called steam generator.

The water supply device 75 is provided to store water to be supplied to the steam supplier 71 and supply water to the steam supplier 71. In this embodiment, the water supply device 75 may be installed in a space formed in the upper portion of the cooking space 15 i.e., an upper portion of the main body 10, for example, but not limited. The water supply device 75 may be disposed at any selected position that is less affected by heat in the high-temperature cooking space 15, may be easily supplied with water from the outside and may readily supply water to the steam supplier 71.

The connection pipe 77 may connect the water supply device 75 and the steam supplier 71 to form a passage through which water supplied from the water supply device 75 moves to the steam supplier 71. The connection pipe 77 may be formed into a flexible tube or a metallic pipe.

Additionally, the connection pipe 77 may connect to the steam supplier 71 through a passage detouring to the rear side of the cooking space 15, or may connect to the steam supplier 71 through the passage detouring to lateral directions of the cooking space 15, while connecting to the steam supplier 71 by detouring from the water supply device 75 to the cooking space 15.

In the cooking appliance of this embodiment having the above configuration, water supplied from the water supply device 75 may flow into the water storage 72 through the connection pipe 77, the water introduced into the water storage 72 may be heated by the steam heater 73 to produce steam, the produced steam may flow or may be supplied into the cooking space 15, and the steam may circulate in the cooking space 15 to cook an object to be cooked.

The water supply of the water supply device 75 may be done by a force triggered by a difference in heights or pressures of the water supply device 75 and the water storage 72, or by power of a pump 76 disposed on a water storage 72 side or a connection pipe 77 side.

The steam supply device 70 may further include a steam spray member 79 configured to spray steam, produced by the steam supplier 71, into the cooking space 15. The steam spray member 79 may be arranged on the upper surface of the cavity 11 or upper side surfaces and connect to the water storage 72 of the steam supplier 71 through a steam pipe 78. The steam spray member 79 may from a passage for spraying steam produced by the steam supplier 71 downward from the upper portion of the cooking space 15 into the cooking space 15.

[Operation of Cooking Appliance in Vacuum Cooking (Sous Vide Cooking) Mode]

Figure 6:
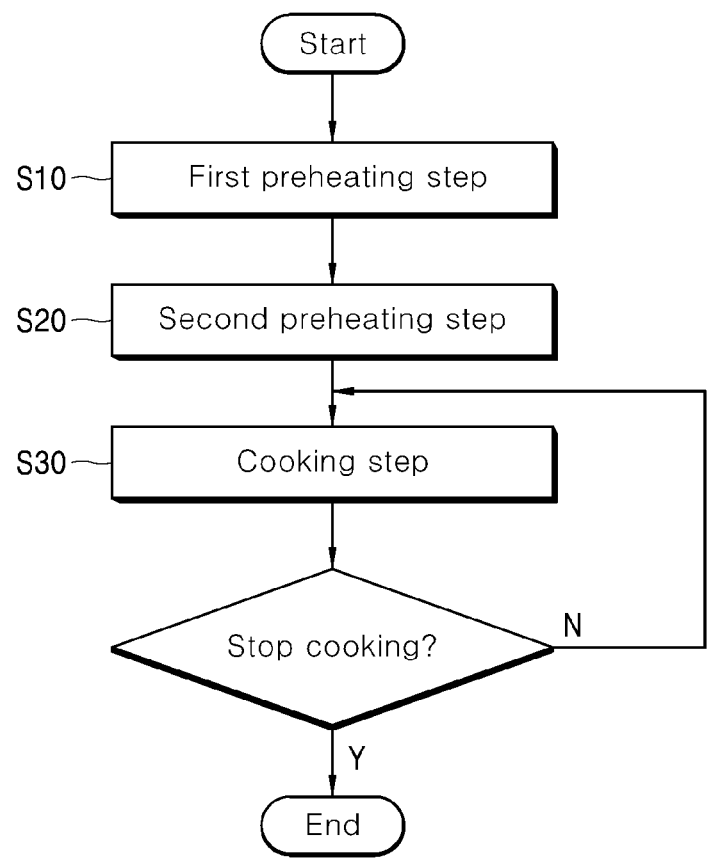
FIG. 6 is a flow chart showing procedures of controlling a cooking appliance using a method for controlling a cooking appliance in one embodiment.
Figure 7:
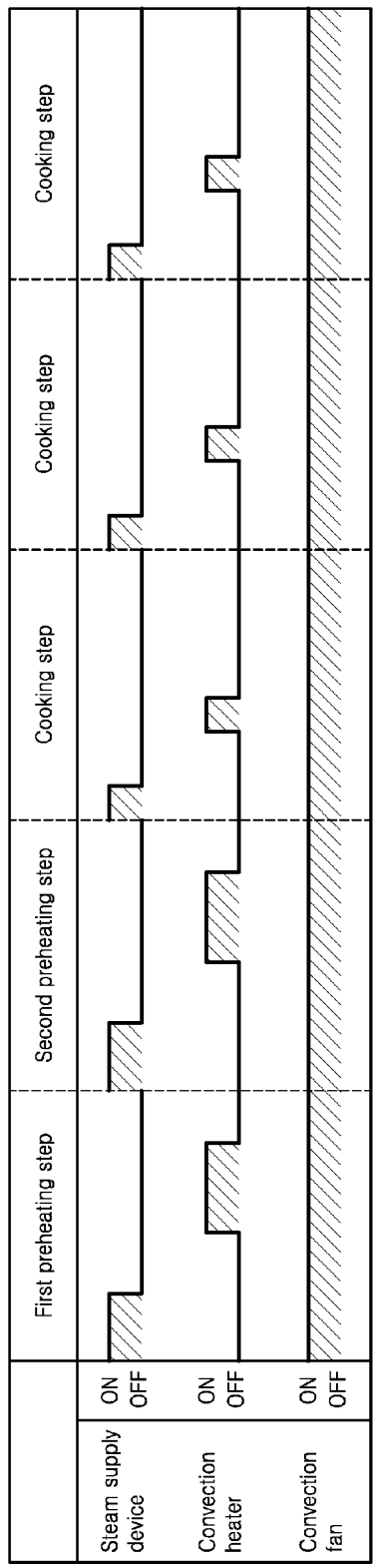
FIG. 7 is a view showing a state in which driving of a cooking appliance is controlled using the method for controlling a cooking appliance in one embodiment.
Figure 8:
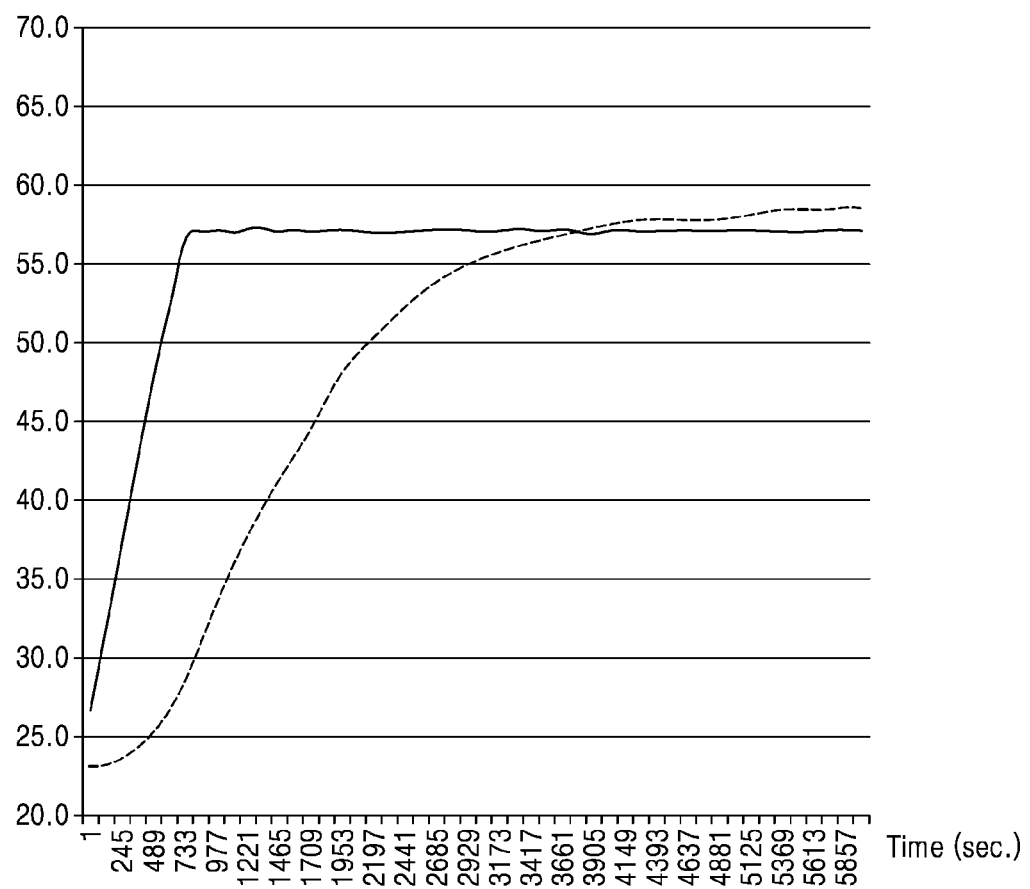
FIG. 8 is a graph showing a trend in temperature changes in a cooking space of a cooking appliance the driving of which is controlled using the method for controlling a cooking appliance in one embodiment.

FIG. 6 is a flow chart showing procedures of controlling a cooking appliance using a method for controlling a cooking appliance in one embodiment, FIG. 7 is a view showing a state in which driving of a cooking appliance is controlled using the method for controlling a cooking appliance in one embodiment, and FIG. 8 is a graph showing a trend in temperature changes in a cooking space of a cooking appliance the driving of which is controlled using the method for controlling a cooking appliance in one embodiment.

Hereunder, an operation of the cooking appliance in a bake mode is described with reference to FIGS. 4 to 8.

Referring to FIGS. 4 to 6, the cooking appliance in this embodiment may perform cooking in any one selected cooking mode among a plurality of cooking modes. The plurality of cooking modes may be classified depending on the sort of a food item to be cooked.

For example, the cooking appliance may operate in a grill mode to grill meat or fish and may operate in a bake mode to bake bread or cookies and the like. Driving of each heater and driving time of each heater depend on a cooking mode.

The cooking modes of the cooking appliance may be classified based on a way of cooking food items, e.g., vacuum cooking. In the vacuum cooking mode, a temperature of the cooking space needs to remain low for a long time. As an example of vacuum cooking, there may be sous vide cooking, and an actual vacuum may not be required for sous vide cooking.

Hereunder, a method for controlling a cooking appliance is described to enable an efficient cooking operation in a vacuum cooking mode.

In the method for controlling a cooking appliance in this embodiment, a first preheating step (S10) and a second preheating step (S20) may be consecutively carried out to preheat the cooking space.

In the first preheating step (S10), the steam supply device 70, the convection heater 53, and the convection fan 55 may operate. In this case, the steam supply device 70 may operate with a first output for one period, and the convection heater 53 may operate with a second output for one period. In this embodiment, the first preheating step (S10) is carried out in a one-time cycle, for example.

In the first preheating step (S10), the steam supply device 70, the convection heater 53 and the convection fan 55 may operate for one period as follows.

In the first preheating step (S10), the steam supply device 70 may operate with a first output for one period, and the convection heater 53 may operate with a second output for one period. The convection fan 55 may operate throughout one period.

The steam supply device 70 and the convection fan 55 may start to operate at the same time from a starting point of one period. The steam supply device 70 may operate with the first output for one period. An output of the steam supply device 70 relates to an amount of steam supplied into the cooking space 15 for one period. That is, as the output of the steam supply device 70 increases, the amount of steam supplied into the cooking space 15 increases for one period. As the output of the steam supply device 70 decreases, the amount of steam supplied into the cooking space 15 decrease for one period.

In this embodiment, the output of the steam supply device 70 is adjusted as a result of adjustment of operation time of the steam supply device 70, for example. Additionally, in this embodiment, an hourly amount of steam supplied by the steam supply device 70 remains constant, for example.

In relation to this, as the operation time of the steam supply device 70 increases, the output of the steam supply device 70 may increase, and as the operation time of the steam supply device 70 decreases, the output of the steam supply device 70 may decrease.

In the first preheating step (S10), the steam supply device 70 may operate to supply steam into the cooking space 15 for first set time of one period. The heating unit, i.e., the convection heater 53, may operate to heat the inside of the cooking space for second set time of one period. The convection fan 55 may keep (constantly) operating from the starting point of one period to an ending point of one period.

That is, in the first preheating step (S10), the steam supply device 70 may operate for the first set time that is part of one period, the convection heater 53 may operate for the second set time that is part of one period, and the convection fan 55 may operate throughout one period.

The steam supply device 70 may supply steam of 100° C. or greater into the cooking space 15, and the steam supplied into the cooking space 15 may rapidly increase a temperature in the cooking space 15. That is, steam of 100° C. or greater supplied into the cooking space 15 may increase the temperature in the cooking space 15 more quickly than a heater such as the convection heater 53 and the like heats the inside the cooking space 15.

FIG. 8 shows a trend in temperature changes in the cooking space 15 of the cooking appliance. The solid line on the graph shows a trend in temperature changes in the cooking space 15 when steam is supplied into the cooking space 15 as in the first preheating step (S10) of this embodiment. The dotted line on the graph shows a trend in temperature changes in the cooking space 15 when the inside of the cooking space 15 is heated only by a heater without being supplied with steam.

The graph in FIG. 8 indicates that the temperature (solid line) in the cooking space 15 increases more quickly when steam is supplied into the cooking space 15 as in the first preheating step (S10) of this embodiment.

In the first preheating step (S10), the cooking space 15 may be preheated using steam that is supplied as a result of operation of the steam supply device 70. Steam may be supplied only for the first set time, which is part of one period, in the first preheating step (S10) instead of being supplied throughout one period.

The first set time may be set considering the steam supply device 70's capability to supply steam, a capacity of the cooking space 15 and the like. For example, the first set time may be set to time for which a sufficient amount of steam is supplied into the cooking space 15 to the degree that the inside of the cooking space 15 is not wet with an excessive amount of steam.

Additionally, in the first preheating step (S10), the cooking space 15 may be heated using a heater as well as steam. That is, in the first preheating step (S10), the cooking space 15 may be heated using the supplied steam and the heater. Accordingly, the inside of the cooking space 15 may be preheated more quickly.

In this embodiment, the inside of the cooking space 15 is heated as a result of operation of the convection heater 53, for example. In the first preheating step (S10), the convection fan 55 may be driven throughout one period, and air heated in the convection heater 53 adjacent to the convection fan 55 may be evenly spread into the cooking space 15 by the convection fan 55.

That is, in the first preheating step (S10), the convection heater 53 and the convection fan 55 adjacent to each other may operate together. Accordingly, the temperature in the cooking space 15 may increase evenly and quickly. Further, the convection heater 53 and the convection fan 55 may allow steam supplied into the cooking space 15 to spread evenly in the cooking space 15 while further increasing a temperature of the steam. Thus, the steam may contribute to a uniform and rapid increase in the temperature in the cooking space 15.

The bake heater 40 may serve as a heat source that heats the bottom surface of the cavity 11 instead of directly heating air in the cooking space since the bake heater 40 is disposed outside the cooking space. The outer broil heater 33 may emit heat at a position near the lateral surfaces of the cavity 11. Accordingly, the outer broil heater 33 may serve as a heat source that heats the lateral surfaces of the cavity 11.

As a result of an increase in the temperature of the cavity 11 and the amount of heat storage in the cavity 11, the temperature in the cooking space 15 may increase more quickly when the inside of the cooking space is heated, and the temperature in the cooking space may readily increase with small volume of heating.

However, the increase in the temperature of the cavity 11 and the amount of heat storage in the cavity 11 may limit the supply of steam into the cooking space 15 when the temperature in the cooking space 15 needs to remain low during a following cooking operation.

For example, in vacuum cooking, a certain amount or greater of steam needs to be supplied while the temperature in the cooking space 15 needs to be maintained at a low temperature appropriate for vacuum cooking. However, when the above increase in the temperature of the cavity 11 and the amount of heat storage in the cavity 11 causes an increase in the temperature of the cooking space 15, the amount of supplied steam needs to decrease to maintain the temperature in the cooking space 15 at a low temperature.

Even though the preheating step is carried out to create an environment appropriate for vacuum cooking in the cooking space 15, the preheating step may result in a lack of steam supplied into the cooking space 15. Thus, an environment fit for vacuum cooking may not be created in the cooking space 15.

Under the circumstances, in the first preheating step (S10) of this embodiment, the convection heater 53 far from heating the cavity 11 directly may be selected to heat the inside of the cooking space 15. The convection heater 53 may contribute to an increase in the temperature in the cooking space 15 while less increasing the temperature and stored heat of the cavity 11 unlike the other heating units.

In the first preheating step (S10), the operation of the steam supply device 70 and the operation of the convection heater 53 may be performed at the same time or at different timings. In this embodiment, the operation of the steam supply device 70 and the operation of the convection heater 53 are performed at different timings, for example. Specifically, the steam supply device 70 may operate earlier than the convection heater 53 may, for example.

Accordingly, steam, which is supplied before the convection heater 53 heats the inside of the cooking space 15, may rapidly increase the temperature of the cooking space 15, and the convection heater 53 may suppress a decrease in the temperature of the cooking space 15 while the supply of the steam stops.

After the first preheating step (S10), the second preheating step (S20) may be carried out. In the second preheating step (S20), the procedures of the first preheating step (S10) may be repeated. That is, like the first preheating step (S10), the second preheating step (S20) may involve operating the steam supply device 70 for the first set time that is part of one period, operating the convection heater 53 for the second set time that is part of one period, and operating the convection fan 55 throughout one period.

In the second preheating step (S20), the preheating procedures in the first preheating step (S10) may be repeated. Accordingly, the cooking space 15 may be sufficiently preheated.

After completion of the second preheating step (S20), a cooking step (S30) may be carried out. The cooking step (S30) may involve heating the inside of the cooking space to cook a food item.

Like the first preheating step (S10) and the second preheating step (S20), the cooking step (S30) may involve operating the steam supply device 70, the convection heater 53 and the convection fan 55. In this case, the steam supply device 70 may operate with a third output for one period, and the convection heater 53 may operate with a fourth output for one period. In this embodiment, the cooking step (S30) are carried out multiple times during a cooking process, for example.

In the cooking step (S30), the steam supply device 70, the convection heater 53 and the convection fan 55 may operate for one period, as follow.

In the cooking step (S30), the steam supply device 70 may operate with the third output for one period, and the convection heater 53 may operate with the fourth output for one period. The convection fan 55 may operate throughout one period.

The steam supply device 70 and the convection fan 55 may operate at the same time from the starting point of one period. The steam supply device 70 may operate with the third output for one period. The third output may be set to an output less the first output. The convection heater 53 may operate with the fourth output for one period. The fourth output may be set to an output less than the second output.

Accordingly, in the cooking step (S30), the steam supply device 70 may operate such that steam is supplied into the cooking space 15 for third set time of one period. The convection heater 53 may operate to heat the inside of the cooking space for fourth set time of one period. The convection fan 55 may keep operating from the starting point of one period to the ending point of one period.

That is, in the cooking step (S30), the steam supply device 70 may operate for the third set time that is part of one period, the convection heater 53 may operate for the fourth set time that is part of one period, and the convention fan 55 may operate throughout one period. In this case, the third set time may be set to time less than the first set time, and the fourth set time may be set to time less than the second set output.

In the cooking step (S30), the temperature in the cooking space 15 may be maintained at a boiling point of water or less. That is, in the cooking step (S30), although steam generated at 100° C., i.e., the boiling point of water, or greater is supplied and a heating operation is performed by the convection heater 53, the temperature in the cooking space 15 may be maintained at the boiling point of water or less.

For the cooking appliance to perform vacuum cooking effectively, the temperature in the cooking space 15 needs to be maintained at a temperature fit for vacuum cooking, i.e., 100° C. or less, for example, in a range of about 40 to 90° C.

In the first preheating step (S10) and the second preheating step (S20), steam may be supplied and heating may be performed to increase the temperature in the cooking space 15 to a temperature fit for vacuum cooking. In the cooking step (S30), steam may be supplied and heating may be performed to maintain the increased temperature in the cooking space 15, which is fit for vacuum cooking.

Unlike the first preheating step (S10) and the second preheating step (S20), the cooking step (S30) may involve setting the outputs of the steam supply device 70 and the convection heater 53 to low outputs. Accordingly, the operation time of the steam supply device 70 and the convection heater 53 may be set to a short time.

As a result, in the cooking step (S30), the temperature in the cooking space 15 preheated in the first preheating step (S10) and the second preheating step (S20) may be maintained at a temperature appropriate for vacuum cooking, and cooking may be performed in the vacuum cooking mode. Here, vacuum cooking mode mainly means that a temperature of the cooking space needs to remain low for a long time.

In the cooking step (S30), the steam supply device 70 and the convection heater 53 may operate at different timings. Specifically, the steam supply device 70 may operate earlier than the convection heater 53 may.

When the steam supply device 70 and the convection heater 53 operate at the same time, the temperature in the cooking space 15 may excessively increase only within this time, and the temperature in the cooking space 15 may be less the temperature appropriate for vacuum cooking at other times. That is, when the steam supply device 70 and the convection heater 53 operate at the same time, a high temperature deviation may occur in the cooking space 15.

When a high temperature deviation occurs in the cooking space 15, vacuum cooking may not be properly performed. Thus, the product of vacuum cooking may not meet satisfaction of a user.

To prevent this from happening, in this embodiment, the steam supply device 70 and the convection heater 53 may operate at different timings, thereby suppressing the occurrence of a temperature deviation in the cooking space 15.

Additionally, the temperature in the cooking space 15 may be more readily maintained when steam is supplied and then heating is performed by the convection heater 53 than when heating is performed by the convection heater 53 and then steam is supplied.

In the latter part of each period, there are times when both the steam supply device 70 and the convection heater 53 stop operating. During the latter part, the temperature in the cooking space 15 tends to go down. Accordingly, when steam for rapidly increasing the temperature in the cooking space 15 is first supplied into the cooking space 15 right after the latter part, the temperature in the cooking space 15 may be maintained at a set temperature effectively and readily.

When steam is supplied and then heating is performed by the convection heater 53, as described above, a temperature of the steam may be prevented from going down while heat supplied by the convection heater 53 heats the steam again, thereby effectively maintaining the temperature in the cooking space 15.

A sufficient amount of moisture needs to be supplied into the cooking space 15 to perform vacuum cooking effectively. Accordingly, it is better to perform the supply of steam into the cooking space 15 first.

While a food item accommodated in the cooking space is cooked, the cooking step (S30) may be carried out multiple times. For example, when the cooking step (S30) of one period is performed for about 60 seconds, about 30 cooking steps (S30) may be carried out for set cooking time of 30 minutes. When the cooking step (S30) is repeated for the set cooking time, the cooking operation in the vacuum cooking mode may be completed.

Hereunder, one embodiment of the first preheating step, the second preheating step and the cooking step is described under the assumption that one period of each of the first preheating step, the second preheating step and the cooking step is set to the same time and that one period is set to 60 seconds.

In the first preheating step (S10), the steam supply device 70 may operate for the first set time that is part of one period, the convection heater 53 may operate for the second set time that is part of one period, and the convection fan 55 may operate through one period.

In this embodiment, the first set time is set to 13 to 17 seconds, preferably, 15 seconds, and the second set time is set to 18 to 22 seconds, preferably, 20 seconds, for example.

Accordingly, the steam supply device 70 may operate for about 15 seconds and then the convection heater 53 may operate for about 20 seconds. That is, steam may be supplied into the cooking space 15 for about 20 seconds and then the convection heater 53 may heat the inside of the cooking space 15 for about 20 seconds.

In this case, a maximum amount of steam may be supplied into the cooking space 15 to the degree that the inside of the cooking space 15 is not wet with water. The convection heater 53 may operate long enough for the temperature in the cooking space 15 to increase to a temperature fit for vacuum cooking while minimizing an increase in temperatures of walls of the cavity 11.

The convection fan 55 may continue to be driven for 60 seconds. Thus, while the steam spreads evenly into the cooking space 15, the temperature in the cooking space 15 may increase uniformly and quickly.

After the first preheating step (S10), the second preheating step (S20) may be carried out. In the second preheating step (S20), the procedures in the first preheating step (S10) may be repeated. Accordingly, detailed description of the second preheating step (S20) is omitted. Since the second preheating step (S20) is repeated after the first preheating step (S10), the cooking space 15 may be preheated for sure to the degree that the temperature of the cooking space is appropriate for vacuum cooking.

After the cooking appliance is preheated, the cooking step (S30) may be carried out in a state in which a food item to be cooked under vacuum is placed in the cooking space 15. In this case, the food item to be cooked under vacuum may be vacuum-packaged in a vacuum seal container such as a plastic pack.

Like the first preheating step (S10) and the second preheating step (S20), the cooking step (S30) may be carried out for about 60 seconds. In the cooking step (S30) carried out for about 60 seconds, the steam supply device 70 may operate with the third output, and the convection heater 53 may operate with the fourth output. The convection fan 55 may operate throughout one period.

In this embodiment, the third set time is set to 7 to 9 seconds, preferably, 8 seconds, and the fourth set time is also set to 7 to 9 seconds, preferably, 8 seconds.

Under the circumstances, the steam supply device 70 may operate for about 8 seconds and then the convection heater 53 may operate for about 8 seconds. That is, steam is supplied into the cooking space 15 for about 8 seconds, and then the convection heater 53 may heat the inside of the cooking space 15 for about 8 seconds.

In this case, the steam supply device 70 and the convection heater 53 may operate respectively until the temperature in the cooking space 15 may be maintained at a temperature fit for vacuum cooking, i.e., 100° C. or less, preferably, in a range of about 40 to 90° C.

In the cooking step (S30), the steam supply device 70 may operate earlier than the convection heater 53 may. Accordingly, temperature deviations in the cooking space 15 may be maintained at 0.1° C. or so while the occurrence of temperature deviations in the cooking space 15 may be suppressed. Further, since the supply of steam takes precedence over anything else s, a sufficient amount of moisture for performing vacuum cooking effectively may be supplied into the cooking space 15.

While a food item accommodated in the cooking space is cooked, the cooking step (S30) may be repeated multiple times. For example, when set cooking time is 30 minutes, about 30 cooking steps (S30) may be carried out. When the cooking step (S30) is repeated for the set cooking time, a cooking operation in a bake mode may be completed.

When vacuum cooking is completed after the completion of the cooking step (S30), the food item cooked under vacuum may be taken out of a vacuum seal container and cooked again using an oven. In this case, the re-cooking operation may be performed in a grill mode or a barbecue mode and the like using at least one of the broil heater 30, the bake heater 40 and the convection device 50.

The above re-cooking operation may be performed using the cooking appliance in this embodiment without using an additional appliance at different position. Accordingly, a food item may be cooked more easily and quickly.

As described above, the method for controlling a cooking appliance in this embodiment may help to supply a sufficient amount of steam for vacuum cooking into the cooking space and to maintain the temperature in the cooking space at a temperature fit for vacuum cooking.

The method for controlling a cooking appliance may help to perform vacuum cooking effectively only using a steam oven without using an additional cooking appliance exclusive for vacuum cooking (sous vide cooking), thereby enhancing usability of the steam oven and reducing costs and space for the cooking appliance exclusive for vacuum cooking.

The method for controlling a cooking appliance in this embodiment may help to properly adjust a timing of the supply of steam, an amount of supplied steam, and a timing of operating the convection heater, thereby effectively maintaining a constant temperature in the cooking space during steam-based cooking and effectively improving the quality of a product of vacuum cooking.

The method for controlling a cooking appliance in this embodiment may help a single cooking appliance to perform an oven cooking operation, a vacuum cooking operation, and a re-cooking operation which is performed in a different way after the vacuum cooking operation, thereby improving economic efficiency, efficiency and usability of the cooking appliance.

The embodiments are described above with reference to a number of illustrative embodiments thereof. However, the embodiments are provided only as examples, and numerous other modifications and embodiments can be devised by one skilled in the art, based on the above embodiments. Thus, the protection scope of the subject matter should be defined by the appended claims.

DESCRIPTION OF REFERENCE NUMERAL

10: Main body
11: Cavity
13: Front panel
15: Cooking space
16: Door
17: Handle
20: Control panel 21: Knob
22: Display
30: Broil heater
31: Inner broil heater
33: Outer broil heater
40: Bake heater
50: Convection device
51: Convection cover
53: Convection heater
55: Convection fan
60: Controller
70: Steam supply device

The invention claimed is:

1. A controlling method performed by a cooking appliance, the cooking appliance comprising a body having a cavity provided therein with a cooking space, a steam supply device to supply steam into the cooking space, a heating unit to heat an inside of the cooking space, a convection fan to generate air flow in the cooking space, and a controller, the method comprising operating the steam supply device and the heating unit to maintain a temperature in the cooking space at a boiling point of water or less,
wherein the method further comprising:
operating a first preheating step comprising operating the steam supply device with a first output and operating the heating unit with a second output for one period; and
operating a cooking step comprising operating the steam supply device with a third output less than the first output and operating the heating unit with a fourth output less than the second output for another period, after completion of the first preheating step,
wherein the heating unit comprises a convection heater disposed on a rear surface of the cavity in a way that the convection heater is adjacent to the convection fan, the method comprising operating only the convection heater among heaters in the cooking appliance in the first preheating step and the cooking step.

2. The method of claim 1, comprising operating the first preheating step and the cooking step to maintain the temperature in the cooking space at a boiling point of water or less.

3. The method of claim 1, wherein the first preheating step comprises operating the steam supply device to supply the steam into the cooking space for a first set time in the one period, and operating the heating unit to heat the inside of the cooking space for a second set time in the one period, and
the cooking step comprises operating the steam supply device to supply the steam into the cooking space for a third set time less than the first set time in the another period, and operating the heating unit to heat the inside of the cooking space for a fourth set time less than the second set time in the another period.

4. The method of claim 3, comprising maintaining an average hourly amount of supplied steam in the first preheating step to be the same as an average hourly amount of supplied steam in the cooking step.

5. The method of claim 3, wherein the one period is 60 seconds,
the first set time is 13 to 17 seconds, and
the third set time is 7 to 9 seconds.

6. The method of claim 3, wherein the another period is 60 seconds,
the second set time is 18 to 22 seconds, and
the fourth set time is 7 to 9 seconds.

7. The method of claim 1, comprising supplying the steam into the cooking space and heating the inside of the cooking space to maintain the temperature in the cooking space in a temperature range of 30 to 90° C. in the cooking step.

8. The method of claim 1, comprising operating the convection fan throughout the first preheating step and the cooking step.

9. The method of claim 1, wherein the method comprises a second preheating step of operating the steam supply device with the first output and operating the heating unit with the second output for one period between the first preheating step and the cooking step.

10. The method of claim 1, comprising operating the cooking step for multiple periods.

11. A cooking appliance comprising:
a body having a cavity provided therein with a cooking space;
a steam supply device to supply steam into the cooking space;
a heating unit to heat an inside of the cooking space;
a convection fan to generate air flow in the cooking space; and
a controller configured to:
operate the steam supply device and the heating unit to maintain a temperature in the cooking space at a boiling point of water or less,
wherein the controller operates:
a first preheating step comprising operating the steam supply device with a first output and operating the heating unit with a second output for one period; and
a cooking step comprising operating the steam supply device with a third output less than the first output and operating the heating unit with a fourth output less than the second output for another period, after completion of the first preheating step,
wherein the heating unit comprises a convection heater disposed on a rear surface of the cavity in a way that the convection heater is adjacent to the convection fan,
and the controller operates only the convection heater among heaters in the cooking appliance in the first preheating step and in the cooking step.

12. The cooking appliance of claim 11, wherein the controller is configured to:
operate a first preheating step by operating the steam supply device to have a first output and operating the heating unit to have a second output for one period; and
operating a cooking step by operating the steam supply device to have a third output less than the first output and operating the heating unit to have a fourth output less than the second output for another period, after completion of the first preheating step.

13. The cooking appliance of claim 12, wherein the controller is configured to operate the first preheating step and the cooking step to maintain the temperature in the cooking space at a boiling point of water or less.

14. The cooking appliance of claim 12, wherein the controller is configured to:
in the first preheating step, operate the steam supply device to supply the steam into the cooking space for a first set time in the one period, and operate the heating unit to heat the inside of the cooking space for a second set time in the one period, and
in the cooking step, operate the steam supply device to supply the steam into the cooking space for a third set time less than the first set time in the another period, and operate the heating unit to heat the inside of the cooking space for a fourth set time less than the second set time in the another period.

15. The cooking appliance of claim 12, wherein the controller is configured to operate the steam supply device earlier than the heating unit.

16. The cooking appliance of claim 12, wherein the controller is configured to supply the steam into the cooking space and heat the inside of the cooking space to maintain the temperature in the cooking space in a temperature range of 30 to 90° C. in the cooking step.

17. The method of claim 1, comprising operating the steam supply device and the heating unit at different time in the cooking step.

18. The method of claim 17, comprising operating the steam supply device earlier than the heating unit.

* * * * *